United States Patent
Greene (10) Patent No.: US 9,432,662 B2
(45) Date of Patent: Aug. 30, 2016

(54) SYSTEMS AND METHODS FOR PICTURE QUALITY MONITORING

(71) Applicant: EchoStar Technologies L.L.C., Englewood, CO (US)

(72) Inventor: Gregory H. Greene, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 4 days.

(21) Appl. No.: 14/553,858

(22) Filed: Nov. 25, 2014

(65) Prior Publication Data
US 2016/0150228 A1   May 26, 2016

(51) Int. Cl.

| H04N 17/00 | (2006.01) |
|---|---|
| H04N 17/02 | (2006.01) |
| H04N 17/04 | (2006.01) |
| H04N 5/50 | (2006.01) |
| H04L 29/08 | (2006.01) |
| H04B 17/309 | (2015.01) |
| H04N 21/647 | (2011.01) |
| H04N 21/44 | (2011.01) |
| H04N 21/462 | (2011.01) |
| H04N 21/442 | (2011.01) |

(52) U.S. Cl.
CPC .......... *H04N 17/004* (2013.01); *H04B 17/309* (2015.01); *H04L 29/08954* (2013.01); *H04N 5/50* (2013.01); *H04N 17/02* (2013.01); *H04N 17/04* (2013.01); *H04N 21/44008* (2013.01); *H04N 21/44209* (2013.01); *H04N 21/4622* (2013.01); *H04N 21/647* (2013.01)

(58) Field of Classification Search
CPC .... H04N 17/004; H04N 17/02; H04N 17/50; H04N 5/50; H04N 21/647; H04N 21/44008; H04N 21/4622; H04N 21/44209; H04L 29/08954; H04B 17/309
USPC ........................................ 348/180, 184, 189
See application file for complete search history.

(56) References Cited

U.S. PATENT DOCUMENTS

| 6,771,323 B1* | 8/2004 | Dean .................... G11B 27/034 348/180 |
|---|---|---|
| 8,839,326 B2* | 9/2014 | Umeroglu ..................... 725/107 |
| 2010/0265334 A1* | 10/2010 | Bhaskaran ............ G06T 7/0002 348/180 |
| 2010/0332519 A1* | 12/2010 | Miki ................. G06F 17/30781 707/769 |
| 2015/0181207 A1* | 6/2015 | Agrawal ................ H04N 17/02 348/189 |

* cited by examiner

*Primary Examiner* — Trang U Tran
(74) *Attorney, Agent, or Firm* — Seed IP Law Group PLLC (57) ABSTRACT

A receiving device performs an action that results in a corrective measure being taken to address a picture quality issue detected in real time in the frames currently being displayed on a television or other device. The receiving device or a remote system compares indications of video frames currently being displayed to stored video frames for that program to detect macroblocking or a frozen video frame. The macroblocking or a frozen video frame may also or instead be detected by image analysis of the frames currently being displayed. If macroblocking or a frozen video frame is detected in the frames currently being displayed, the set-top box may switch to an alternative video source, change to a standard definition channel broadcasting the same video program or perform other corrective actions.

13 Claims, 7 Drawing Sheets

SYSTEMS AND METHODS FOR PICTURE QUALITY MONITORING

TECHNICAL FIELD

The technical field relates to media content, and particularly picture quality monitoring of media content.

BRIEF SUMMARY

In one embodiment, a set-top box may perform an action that results in a corrective measure being taken to address a detected picture quality issue in the frames currently being displayed on a television or other device. If macroblocking or a frozen video frame is detected in the frames currently being displayed, the set-top box may take any number or combination of various corrective actions. For example, the set-top box may switch to an alternative video source; change to a standard definition channel broadcasting the same video program; switch to sending or receiving the video program in standard definition instead of high definition; restart the decoder or decoding process; and/or cause a pop-up message or other notification to be displayed notifying the user of on-demand or other alternative video sources available for that same program.

The set-top box may perform this detection of picture quality issues or a remote system in communication with the set-top box, such as a content server, may perform this detection. This detection may be based on indications received from the set-top box of which video program and which frames of the video program are currently being displayed. These indications also include the corresponding video frame data or samples of the video frame data currently being displayed. The remote system compares these indications of video frames currently being displayed to stored video frames for that program on the remote system. Based on this comparison, metadata regarding picture quality of the video frames is then communicated back to the set-top box such that the set-top box may then perform an action based on the received metadata that results in a corrective measure being taken to address the picture quality. Macroblocking or a frozen video frame may also or instead be detected by image analysis of the frames currently being displayed to recognize properties of such picture quality issues. All or some of these functions may be performed by the set-top box internally.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
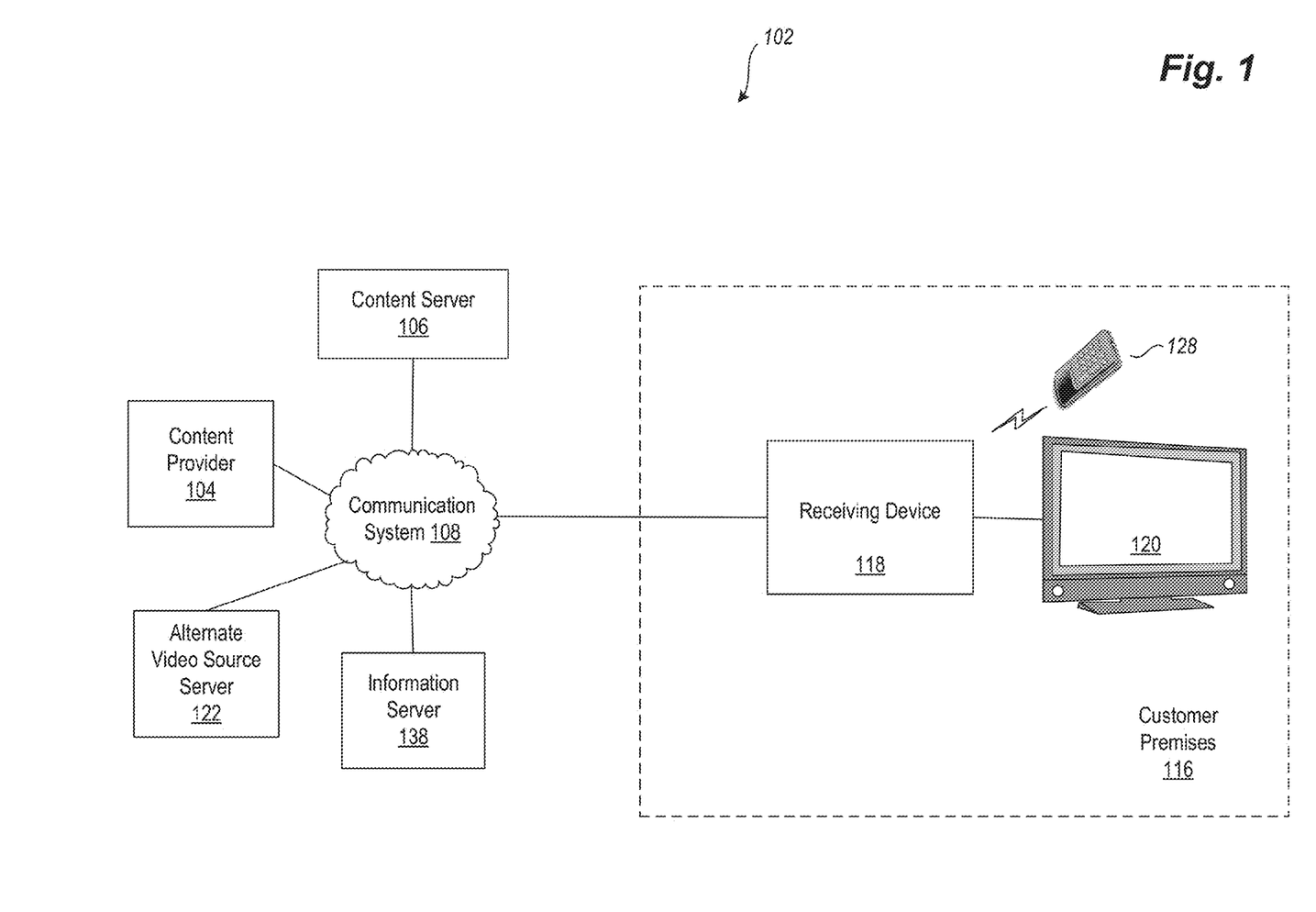
FIG. 1 is a block diagram illustrating an example content distribution environment in which embodiments of picture quality monitoring may be implemented, according to one example embodiment.

FIG. 1 is an overview block diagram illustrating an example content distribution environment in which embodiments of picture quality monitoring may be implemented, according to one example embodiment. Shown in FIG. 1 is a receiving device 118 in operable communication with a presentation device 120. The receiving device 118 may perform an action that results in a corrective measure being taken to address a detected picture quality issue in the frames currently being displayed on the presentation device 120.

For example, macroblocking often occurs when compressed digital video is decoded and displayed. Macroblocking is a video artifact in which objects or areas of a video image displayed on the presentation device 120 appear to be made up of small squares, rather than proper detail and smooth edges. The blocks may appear throughout the image, or just in portions of the image. Macroblocking may be caused by issues that are related to one or more of the following factors: video compression, data transfer speed, signal interruption, and video processing performance.

Also, another picture quality issue that may occur is that the displayed digital video may freeze on a single frame of the digital video such that the same image is displayed on the presentation device 120 during displaying of the video program on the presentation device 120. In other words, the program appears to be "stuck" on the same image. This can indicate a problem in either the video import or encoding processes. If it's a streaming or broadcast video, there could be bandwidth problems or connection errors.

In one embodiment, if macroblocking or a frozen video frame is detected in the frames currently being displayed on the presentation device 120, the receiving device 118 or a remote system in communication with the receiving device 118, such as content provider 104, content server 106, alternate video source server 122 or information server 138, may take any number or combination of various corrective actions. For example, the receiving device 118 or a remote system may switch to an alternative video source; change to a standard definition channel broadcasting the same video program; switch to sending or receiving the video program in standard definition instead of high definition; restart the decoder or decoding process of the receiving device 118; request the video frames be re-sent to the receiving device 118; alter the decoding process at the receiving device 118; adjust video quality to account for bandwidth availability and/or connection speed; perform adaptive bitrate streaming; adjust adaptive bitrate streaming settings; adjust bitrate to account for bandwidth availability and/or connection speed; and/or cause a pop-up message or other notification to be displayed on the presentation device 120 notifying the user of on-demand or other alternative video sources available for that same program.

The receiving device 118 may perform this detection of picture quality issues or such detection may be performed by a remote system in communication with the receiving device 118, such as content provider 104, content server 106, alternate video source server 122 or information server 138. This detection may be based on indications received from the receiving device 118 of which video program and which frames of the video program are currently being displayed on the presentation device 120. These indications also include the corresponding video frame data or samples of the video frame data currently being displayed. The remote system will then compare these indications of video frames currently being displayed on the presentation device 120 to stored video frames for that program on the remote system. Based on this comparison, metadata regarding picture quality of the video frames is then communicated back to the receiving device 118 such that the receiving device 118 may then perform an action based on the received metadata that results in a corrective measure being taken to address the picture quality.

In performing video freeze detection, the receiving device 118 or remote system in communication with the receiving device 118, such as content provider 104, content server 106, alternate video source server 122 or information server 138, compares the current frame with the previous one. If the two frames are the same, then the process repeats until a specified number of simultaneous compares show identical frames. This process also distinguishes between user-initiated pause and true video freezes.

For macroblocking detection, the receiving device 118 or remote system in communication with the receiving device 118, such as content provider 104, content server 106, alternate video source server 122 or information server 138, uses edge and corner detection techniques to detect potential macroblocks. Note that macroblocks are squares of incorrect or missing video so the process includes searching for images with multiple square objects and searching for perpendicular edges of equal length. In some embodiments, the search is further refined by searching for square objects with single or very similar color values (green squares, for example). The search finds multiple cases of square objects which are identical in shape to distinguish true macroblocking from normal video content with square objects.

As explained above, the receiving device 118 or a remote system in communication with the receiving device 118, may perform an action that results in a corrective measure being taken to address a detected picture quality issue in the frames currently being displayed on the presentation device 120. This may be a user-selectable option and modified based on user selectable options. Selection of such options may be provided to the user via a menu or other graphical user interface element displayed on the presentation device 120 and/or a display panel of the receiving device 118. Such user options may also be provided via user interface elements on the remote control device 128. For example, the user may select to turn on or off the capability to detect picture quality issue in the frames currently being displayed on the presentation device 120; select which action or actions are to perform that result in a corrective measure being taken to address a detected picture quality issue; select when and the order in which actions are to be performed that result in a corrective measure being taken to address a detected picture quality issue; select for which channel or programs and at which times picture quality detection is to be performed; select for which channel or programs and at which times actions are to be performed that result in a corrective measure being taken to address a detected picture quality issue; select on which devices picture quality detection is to be performed; and select on which devices actions are to be performed to address detected picture quality issues. These options may also be selected and set per user, saved in a user's profile stored on the receiving device 118 or remote system accessible via the receiving device 118, and/or be part of a master user control system accessible via the receiving device 118.

Before providing additional details regarding the operation and constitution of methods and systems for picture quality monitoring, the example content distribution environment 102, within which such a system may operate, will briefly be described.

In the content distribution environment 102, audio, video, and/or data service providers, such as television or streaming media service providers, provide their customers a multitude of video and/or data programming (hereafter, "programming"). Such programming is often provided by use of a receiving device 118 communicatively coupled to a presentation device 120 configured to receive the programming. The programming may include any type of media content, including, but not limited to: television shows, news, movies, sporting events, advertisements, other video or audio, etc.

The receiving device 118 interconnects to one or more communications media or sources (such as a cable head-end, satellite antenna, telephone company switch, Ethernet portal, off-air antenna, content server, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, examples of a receiving device 118 may include, but are not limited to, devices such as: a receiver, a television converter, a set-top box, television receiving device, television receiver, television recording device, satellite set-top box, satellite receiver, cable set-top box, cable receiver, media player, a digital video recorder (DVR), smartphone, mobile device, tablet device, a personal computer (PC), and/or television tuner. Accordingly, the receiving device 118 may be any suitable converter device or electronic equipment that is operable to receive or play back programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 may include, but are not limited to: a television (TV), a personal computer (PC), a television or computer monitor, sound system receiver, smartphone, mobile device, tablet device, game system, or the like. A presentation device 120 may employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, which may have or control equipment such as the content server 106. Example content providers include television stations which provide local or national television programming, special content providers which provide premium-based programming, subscription-based programming or pay-per-view programming.

Program content (i.e., a program including or not including advertisements), is communicated to the content server 106 from the content provider 104 through suitable communication media, generally illustrated as communication system 108 for convenience. Communication system 108 may include many different types of communication media, now known or later developed. Non-limiting media examples include satellite, telephone systems, the Internet, internets, intranets, cable systems, cellular systems, fiber optic systems, microwave systems, asynchronous transfer mode ("ATM") systems, packet-switched systems, frame relay systems, digital subscriber line ("DSL") systems and radio frequency ("RF") systems.

In at least one embodiment, the received program content is converted by the content server 106 into a suitable signal (a "program signal") that is ultimately communicated to the receiving device 118. For example, this program signal may include or represent video data. Other embodiments of the receiving device 118 may receive programming directly from a content server 106, a content provider 104, alternate video source server, and/or another information server 138 via satellite, locally broadcast RF signals, cable, fiber optic, Internet media, or the like.

In addition, information server 138 may provide various forms of content and/or services to various devices residing in the customer premises 116. For example, information server 138 may also provide metadata to the receiving device 118 regarding picture quality of the video frames video that are currently being displayed on the presentation device 120. In other embodiments, the receiving device 118 may generate such metadata regarding picture quality of the video frames video that are currently being displayed on the presentation device 120.

In the illustrated example, the content provider 104, information server 138 and/or alternate video source server 122 may receive information from the receiving device 118. For example, the content provider 104, information server 138 and/or alternate video source server 122 may receive indications from the receiving device 118 of which program is currently being displayed on the presentation device 120, which video frames of the program are currently being displayed on the presentation device 120 and/or corresponding video frame data or samples of the video frame data currently being displayed on presentation device 120. These indications, for example, may include, but are not limited to, program identifiers, program title, program title identifiers, frame identifiers, frame numbers, tags, frame headers, index numbers, temporal sequence number, frame metadata, keyframe identifiers of a current scene, compressed video data representing the frames currently being displayed, data indicating macroblocks, data indicating a frozen video frame, etc.

The content provider 104, information server 138, content server 106 and/or alternate video source server 122 may also control the receiving device 118 by sending commands or metadata associated with picture quality to cause the receiving device 118 to perform an action that results in a corrective measure being taken to address a detected picture quality issue in the frames currently being displayed on the presentation device 120. In some embodiments, content provider 104, information server 138, content server 106 and/or alternate video source server 122 could also send commands to the receiving device 118 through a wired medium (e.g., Ethernet) to the receiving device 118.

In one embodiment, the alternate video source server 122 is configured to select particular content or media content segment (e.g., a program) to be provided to the receiving device 118 as an alternative to what is currently being sent and displayed on presentation device 120. For example, this may occur in circumstances where the picture quality issues detected in the video program currently being displayed on presentation device 120 cannot be recovered from otherwise. This may be based on video frame indications received by the alternate video source server 122 from the receiving device 118 or in response to a command received by the alternate video source server 122 from the receiving device 118 or other remote system. As previously mentioned, the received indications from the receiving device 118 may indicate which video frames of a program are currently being displayed on the presentation device 120 and the corresponding video frame data or samples of the video frame data currently being displayed.

The above description of the content distribution environment 102, the customer premises 116, and the various devices therein, is intended as a broad, non-limiting overview of an example environment in which various embodiments of picture quality monitoring may be implemented. FIG. 1 illustrates just one example of a content distribution environment 102 and the various embodiments discussed herein are not limited to such environments. In particular, content distribution environment 102 and the various devices therein may contain other devices, systems and/or media not specifically described herein.

Example embodiments described herein provide applications, tools, data structures and other support to implement picture quality monitoring. Other embodiments of the described techniques may be used for other purposes, including picture quality monitoring for or on other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
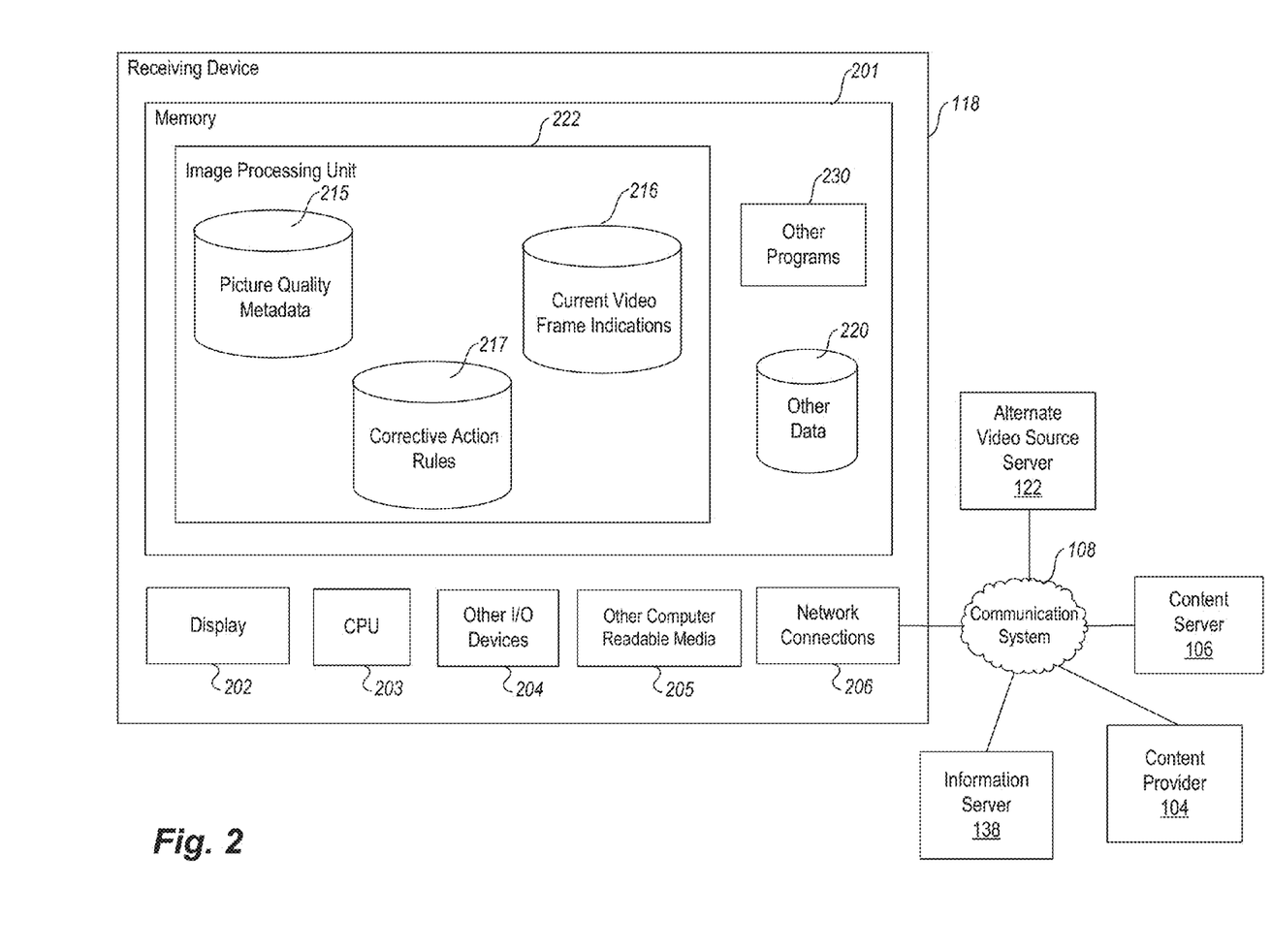
FIG. 2 is a block diagram illustrating elements of an example receiving device used in picture quality monitoring, according to one example embodiment.

FIG. 2 is a block diagram illustrating elements of an example receiving device 118 used in picture quality monitoring, according to one example embodiment.

In one embodiment, the receiving device 118 is a set-top box configured to receive, record and display programming on a presentation device. In other embodiments, the receiving device 118 is a presentation device, such as a television or mobile device.

Note that one or more general purpose or special purpose computing systems/devices may be used to operate the receiving device 118; store information regarding the receiving device 118, picture quality metadata, corrective action rules, including rules for performing actions based on the picture quality metadata, current video frame indications, and communicate with the content provider 104, content server 106, information server 138 and/or alternate video source server 122. In addition, the receiving device 118 may comprise one or more distinct computing systems/devices and may span distributed locations. Furthermore, each block shown may represent one or more such blocks as appropriate to a specific embodiment or may be combined with other blocks. Also, the image processing unit 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output (I/O) devices 204 (e.g., keyboard, mouse, RF or infrared receiver, light emitting diode (LED) panel, cathode ray tube (CRT) or liquid crystal display (LCD), USB ports, other communication ports, and the like), other computer-readable media 205, and network connections 206. The image processing unit 222 is shown residing in memory 201. In other embodiments, some portion of the contents and some, or all, of the components of the image processing unit 222 may be stored on and/or transmitted over the other computer-readable media 205. The components of the receiving device 118 and image processing unit 222 preferably execute on one or more CPUs 203 and facilitate the receiving, decoding, processing, selecting, recording, playback and displaying of programming, as described herein. The image processing unit 222 also facilitates receiving and storage of picture quality metadata, current video frame indications, and corrective action rules, and communication with peripheral devices, via the I/O devices 204 and with remote systems (e.g., the content provider 104, the alternate video source server 122, the content server 106, and/or the information server 138) via the network connections 206.

Picture quality metadata may reside on the picture quality metadata repository 215. This picture quality metadata may be metadata regarding existence, character, type, identification and/or extent of picture quality issues of a video program being output by the receiving device 118 for display on the presentation device 120 shown in FIG. 1. For example, the picture quality metadata may include information indicating or identifying the existence of macroblocking or frozen video issues in the video frames currently being output by the receiving device 118 for display, or currently being displayed, on the presentation device 120 shown in FIG. 1. This picture quality metadata may be received from a remote source, such as content provider 104, content server 106, information server 138 and/or alternate video source server 122 in response to the image processing unit 222 sending over communication system 108 indications of which video program and which video frames of the program are currently being displayed on the presentation device 120, or which video program and which video frames of the program are currently being output by receiving device 118 for display. These indications also include the corresponding video frame data or samples of the video frame data currently being displayed. Such indications may be stored or buffered in the current video frame indications repository 216.

In some embodiments, the picture quality metadata may be generated by the receiving device 118 itself. Whether generated by the receiving device 118 and/or a remote source, such as content provider 104, content server 106, information server 138 and/or alternate video source server 122, such metadata may be generated by one or a combination of image processing techniques. For example, in performing video freeze detection, the receiving device 118 or remote system in communication with the receiving device 118, such as content provider 104, content server 106, alternate video source server 122 or information server 138, compares the current frame with the previous one. If the two frames are the same, then the process repeats until a specified number of simultaneous compares show identical frames. This process also distinguishes between user-initiated pause and true video freezes.

For macroblocking detection, the receiving device 118 or remote system in communication with the receiving device 118, such as content provider 104, content server 106, alternate video source server 122 or information server 138, uses edge and corner detection techniques to detect potential macroblocks. Note that macroblocks are squares of incorrect or missing video so the process includes searching for images with multiple square objects and searching for perpendicular edges of equal length. In some embodiments, the search is further refined by searching for square objects with single or very similar color values (green squares, for example). The search finds multiple cases of square objects which are identical in shape to distinguish true macroblocking from normal video content with square objects.

The corrective action rules repository 217 stores rules, instructions and/or options regarding, but not limited to, one or more of the following: performing an action based on the received metadata that results in a corrective measure being taken to address the picture quality 120; under what circumstances and when an action is to be performed based on the received metadata that results in a corrective measure being taken to address the picture quality 120; specific actions to perform based on the received metadata; specific actions to perform based on the received metadata that results in a corrective measure being taken to address the picture quality 120; specific actions to perform based on options that may be provided to the user via a menu or other graphical user interface element; specific actions to perform based on user profiles; specific actions to perform based on user preferences; specific actions to perform based on selections of when and the order in which actions are to be performed that result in a corrective measure being taken to address a detected picture quality issue; specific actions to perform based on which channels, programs and times have been selected for picture quality detection; specific actions to perform based on which channels, programs and times have been selected for actions that are to be performed that result in a corrective measure being taken to address a detected picture quality issue; specific actions to perform based on selections of devices on which picture quality detection is to be performed; and specific actions to perform based on selections of devices on which actions are to be performed to address a detected picture quality issues.

Such rules stored in the corrective action rules repository 217 may be selected and set per user, saved in a corresponding user's profile stored in the corrective action rules repository 217, other data repository 220 or remote system accessible via the receiving device 118. Such rules stored in the corrective action rules repository 217 may also or instead be part of a master user control system profile stored in the corrective action rules repository 217, other data repository 220, or remote system accessible via the receiving device 118.

The current video frame indications may be collected by the image processing unit or other programs 230 and communicated via the network connections 206 through the communication system 108 to the content server 106, the content provider 104, information server 138 and/or alternate video source server 122 to facilitate generation and receiving of the picture quality metadata of the video frames currently being displayed on the presentation device 120. Also, the image processing unit 222 may interact via the communication system 108 with other devices. For example, the other device may be a home computing system (e.g., a desktop computer, a laptop computer, etc.) that includes or has access to (e.g., via communication system 108) the functionality of the content provider 104, information server 138 and/or alternate video source server 122. The corresponding picture quality metadata may have come from the receiving device 118 or may have come from an external source.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and image processing unit 222 include an application program interface ("API") that provides programmatic access to one or more functions of the receiving device 118 and image processing unit 222. For example, such an API may provide a programmatic interface to one or more functions of the image processing unit 222 that may be invoked by one of the other programs 230, the content provider 104, content server 106, information server 138, alternate video source server 122, or some other module. In this manner, the API may facilitate the development of third-party interfaces, plug-ins, adapters (e.g., for integrating functions of the image processing unit 222 and information server 138 into desktop applications), and the like, to facilitate the picture quality monitoring as described herein, including, for example, performing actions based on the picture quality metadata that results in a corrective measure being taken to address the picture quality 120.

In an example embodiment, components/modules of the receiving device 118 and image processing unit 222 are implemented using standard programming techniques. For example, the image processing unit 222 may be implemented as a "native" executable running on the CPU 203, along with one or more static or dynamic libraries. In other embodiments, the receiving device 118 and image processing unit 222 may be implemented as instructions processed by a virtual machine that executes as one of the other programs 230. In general, a range of programming languages known in the art may be employed for implementing such example embodiments, including representative implementations of various programming language paradigms, including, but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like). Various image, graphics, and video processing platforms, standards, encoding and decoding techniques and APIs may be utilized accordingly in the implementation of the components/modules of the receiving device 118 and image processing unit 222. For example, ITU-R Recommendation BT.601 encoding, more commonly known by the abbreviations Rec. 601 or BT.601 (or its former name, CCIR 601) may be used for broadcast stations, MPEG-4 may be used for online distribution of large videos and video recorded to, MPEG-2 may be used for DVDs, Super-VCDs, and many broadcast television formats, MPEG-1 may be used for video CDs. Also available are H.261, H.263, H.264 encoding also known as MPEG-4 Part 10, or as AVC, used for Blu-ray Discs and some broadcast television formats.

In a software or firmware implementation, instructions stored in a memory configure, when executed, one or more processors of the receiving device 118 to perform the functions of the image processing unit 222. In one embodiment, instructions cause the CPU 203 or some other processor, such as an I/O controller/processor, to perform the actions of the receiving device 118 and image processing unit 222 described herein. For example, this may include, but is not limited to, generating and/or receiving metadata regarding picture quality issues of video frames currently being displayed on the presentation device 120 and performing actions based on the metadata that results in a corrective measure being taken to address the picture quality. Some or all of the actions of the receiving device 118 and image processing unit 222 described herein may instead or also be performed by a remote system such as, for example, the content provider 104, content server 106, information server 138, alternate video source server 122, or some other module.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including, but not limited to, multiprogramming, multithreading, client-server, or peer-to-peer, running on one or more computer systems, each having one or more CPUs. Some embodiments may execute concurrently and asynchronously, and communicate using message passing techniques. Equivalent synchronous embodiments are also supported by the image processing unit 222 implementation. Also, other functions could be implemented and/or performed by each component/module, and in different orders, and by different components/modules, yet still achieve the functions of the receiving device 118 and image processing unit 222.

In addition, programming interfaces to the data stored as part of the receiving device 118 and image processing unit 222, can be available by standard mechanisms such as through C, C++, C#, and Java APIs; libraries for accessing files, databases, or other data repositories; scripting languages such as XML; or Web servers, FTP servers, or other types of servers providing access to stored data. The picture quality metadata repository 215, corrective action rules repository 217, or current video frame indications repository 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including, but not limited to, TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the image processing unit 222.

Furthermore, in some embodiments, some or all of the components of the receiving device 118 and image processing unit 222 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
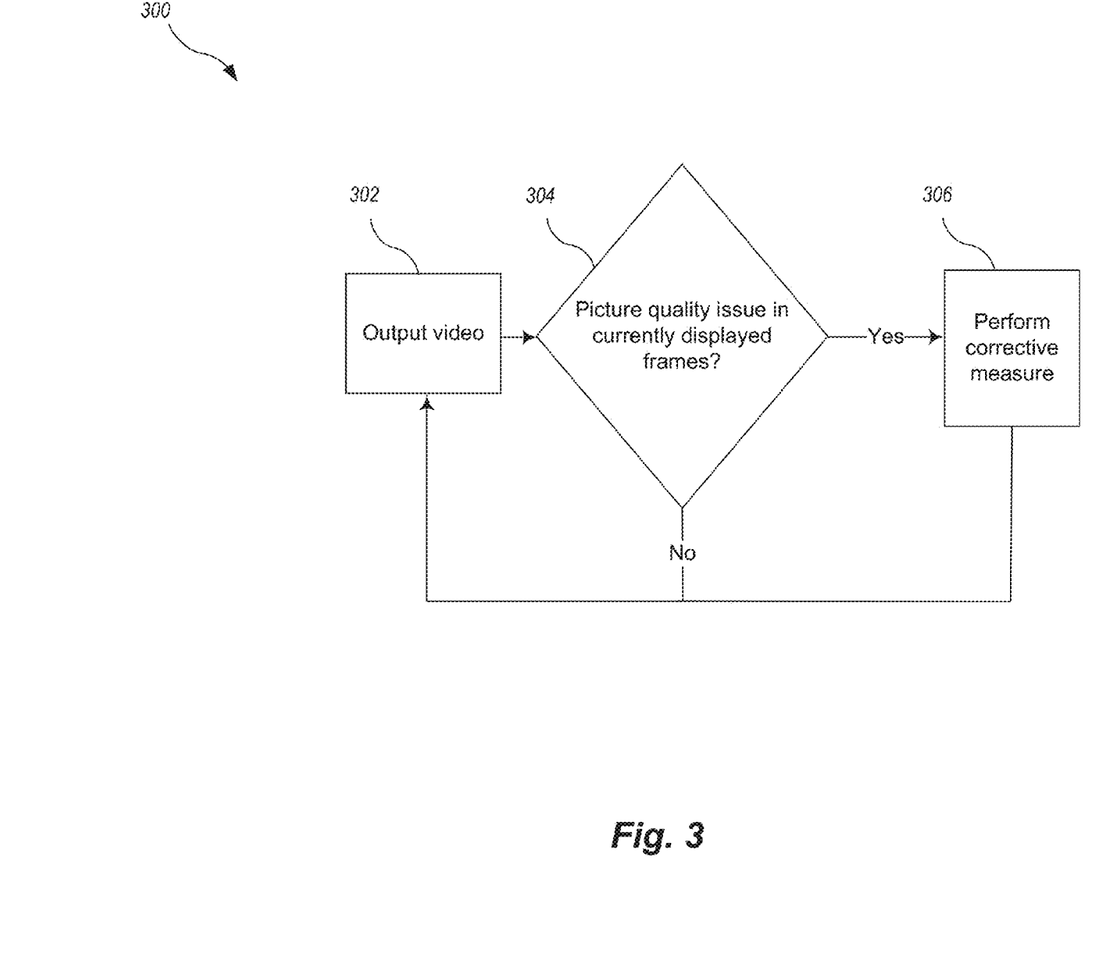
FIG. 3 is a flow diagram of a method of picture quality monitoring, according to one example embodiment.

FIG. 3 is a flow diagram of a method 300 of picture quality monitoring, according to one example embodiment.

At 302, the receiving device 118 outputs video to a presentation device 120 for display on the presentation device 120. The outputted video includes a plurality of video frames.

At 304, the receiving device 118, or a system remote from the receiving device 118, determines whether there exists a picture quality issue in video frames that are currently being displayed on the presentation device 120 based on the video being output. This occurs in real time while the receiving device 118 is outputting the video to the presentation device 120. If it is determined there does not exist a picture quality issue in video frames that are currently being displayed on the presentation device 120, then the process returns to 302, where the receiving device 118 continues to output video to a presentation device 120 for display on the presentation device 120. If it is determined there does exist a picture quality issue in video frames that are currently being displayed on the presentation device 120, then the process returns to 306.

At 306, the receiving device 118, or a system remote from the receiving device 118, performs an action in response to the determination that results in a corrective measure being taken to address the picture quality issue. This is based on the determination made at 304 that there exists a picture quality issue in video frames that are currently being displayed on the presentation device 120. The process then returns to 302, where the receiving device 118 continues to output video to a presentation device 120 for display on the presentation device 120.

Figure 4:
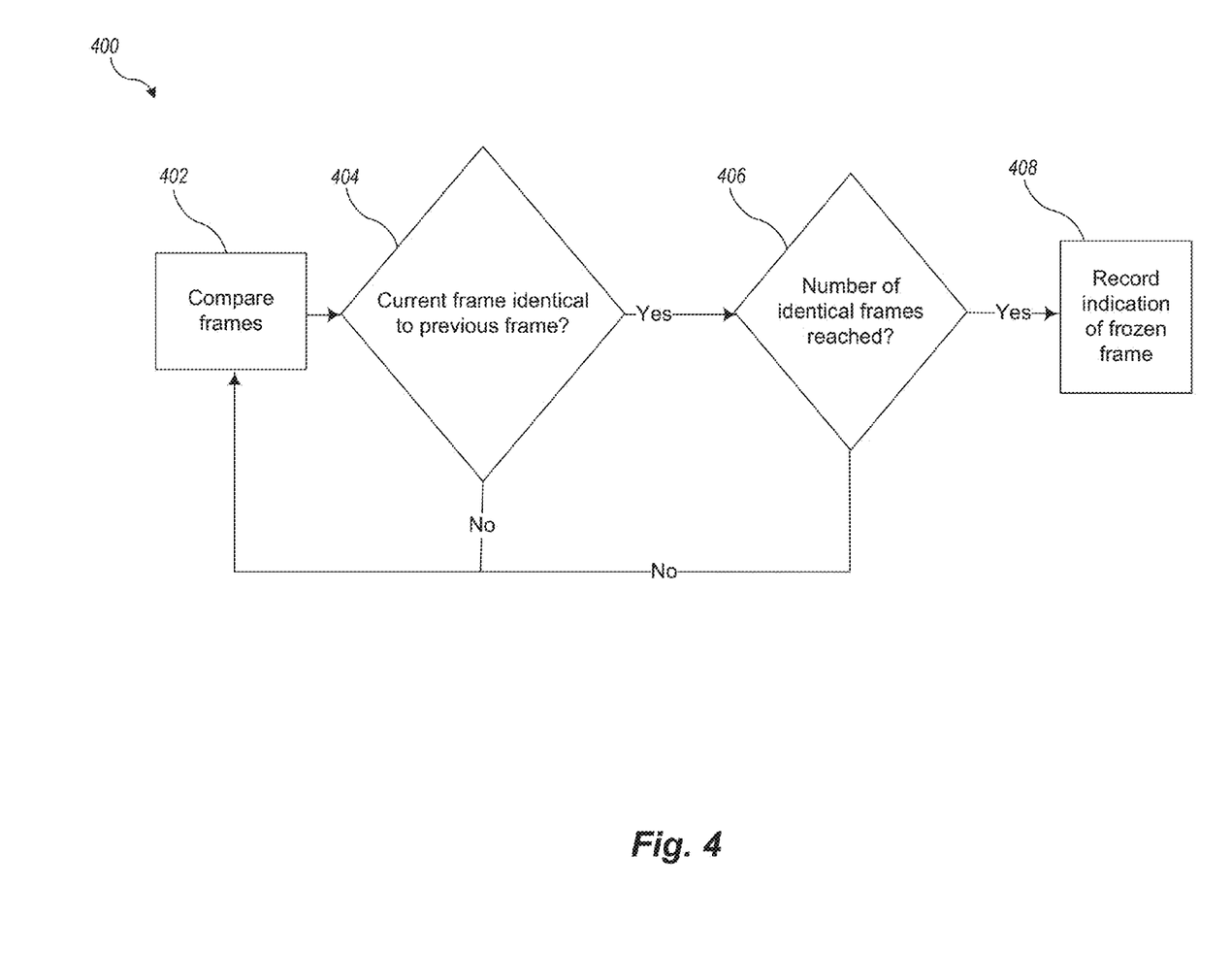
FIG. 4 is a flow diagram of a method of detecting a frozen frame picture quality issue in the method shown in the flow diagram of FIG. 3, according to one example embodiment.

FIG. 4 is a flow diagram of a method 400 of detecting a frozen frame picture quality issue in the method shown in the flow diagram of FIG. 3, according to one example embodiment. In particular, the method of FIG. 4 is one example of how the method 300 of FIG. 3 may determine whether there exists a picture quality issue regarding a frozen video frame that is currently being displayed on the presentation device 120.

At 402, the receiving device 118, or a system remote from the receiving device 118, compares a current frame being displayed on the presentation device 120 with an immediate previous frame that was displayed on the presentation device 120.

At 404, the receiving device 118, or a system remote from the receiving device 118, determines, based on the comparison in 402, whether the current frame being displayed is identical to the immediate previous frame that was displayed. If it was determined that the current frame being displayed is not identical to the immediate previous frame that was displayed, the process returns to 402 where the receiving device 118, or a system remote from the receiving device 118, continues to compare the next frame currently being displayed on the presentation device 120 with the immediate previous frame that was displayed on the presentation device 120. If it was determined that the current frame being displayed is identical to the immediate previous frame that was displayed, the process continues on to 406.

At 406, the receiving device 118, or a system remote from the receiving device 118, determines whether a specified number of consecutive identical frames have been detected as having been displayed. For example, in some embodiments, this may be 10, 20, 30, 40, 50 or 60 frames, or any other number of frames. In other embodiments, the receiving device 118, or a system remote from the receiving device 118, determines whether a specified number of consecutive identical frames have been detected over a specified period of time, for example, 1, 2, 3, 4 or 5 seconds, or any other specified period of time. If it was determined that the specified number of consecutive identical frames have not been detected as having been displayed, then the process returns to 402 where the receiving device 118, or a system remote from the receiving device 118, continues to compare the next frame currently being displayed on the presentation device 120 with the immediate previous frame that was displayed on the presentation device 120. If it was determined that the specified number of consecutive identical frames have been detected as having been displayed, then the process continues on to 408.

At 408, the receiving device 118, or a system remote from the receiving device 118, records an indication that the picture quality issue is a frozen video frame. In various embodiments, this indication may be saved in the picture quality metadata repository 215 of the receiving device 118, sent to a remote system in communication with the receiving device 118, such as content provider 104, content server 106, alternate video source server 122 or information server 138 and/or acted on in accordance with the corrective action rules stored in the corrective action rules repository 217 to address the detected picture quality issue. Also, the frame indications of the consecutive identical frames have been detected as having been displayed may be stored in the current video frame indications repository 216.

In some embodiments, the method 400 also distinguishes between user-initiated pause and true video freezes. In particular, the method 400 may also include recording the indication that the picture quality issue is a frozen video frame only if it had been determined that the specified number of consecutive identical frames detected were not the result of a pause command. This may be accomplished, for example, by the receiving device 118 tracking whether the pause command had been activated and was currently active when the identical frames were detected at 404.

Figure 5:
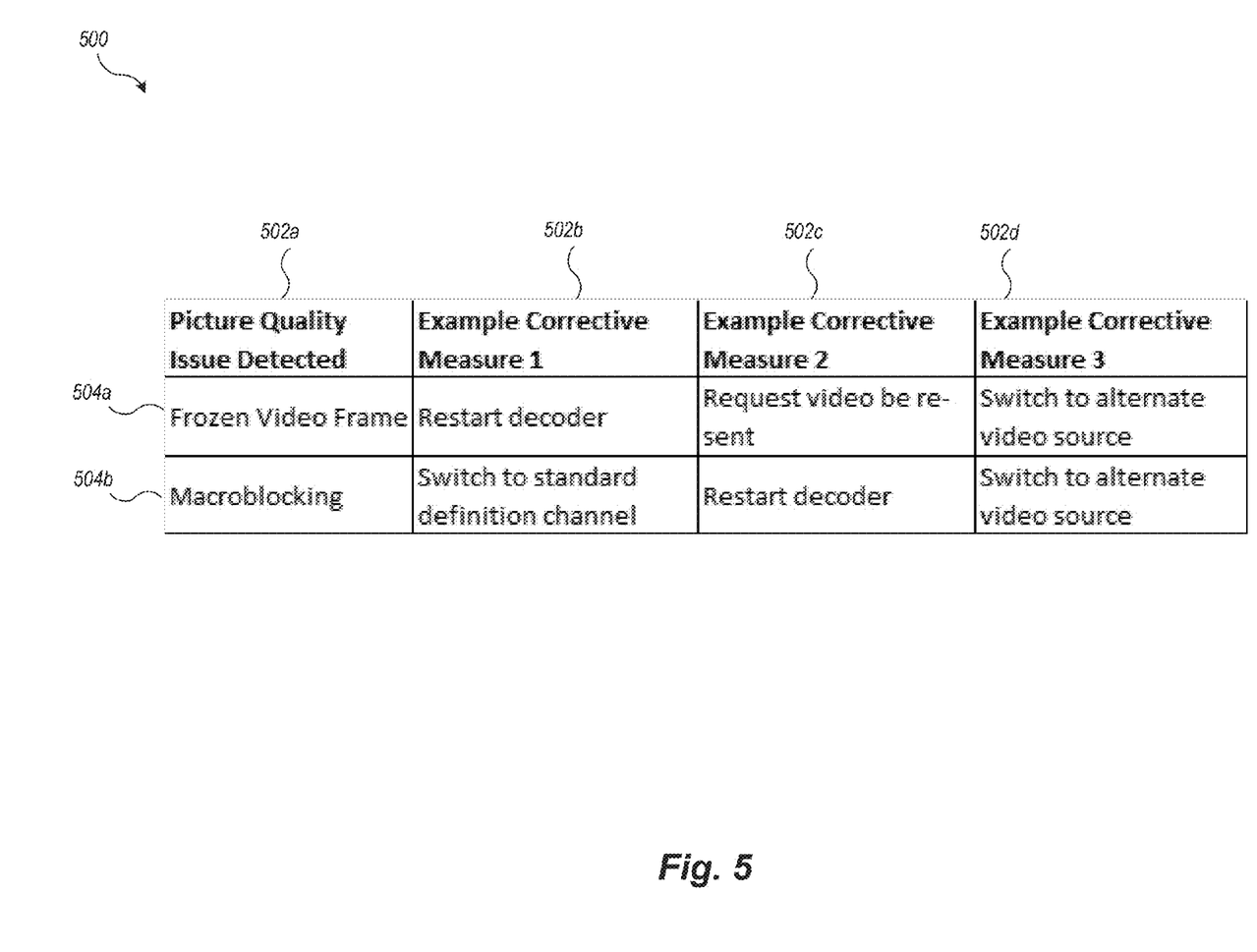
FIG. 5 is a table illustrating example corrective measures to be performed based on various picture quality issues, according to one example embodiment.

FIG. 5 is a table 500 illustrating example corrective measures to be performed based on various picture quality issues, according to one example embodiment. The table 500 and/or the data represented in the table 400, or portions thereof, may be stored on and/or generated by the receiving device 118 and/or a remote system, such as the content provider 104, content server 106, alternate video source server 122 or information server 138 shown in FIG. 1 and FIG. 2. Table 500 shows some example actions that may be performed that result in a corrective measure being taken to address a detected picture quality issue in the frames currently being displayed on the presentation device 120. For example, such actions may be those performed at 306 in the method of picture quality monitoring 300 shown in FIG. 3.

In particular, column 502a indicates the picture quality issue that was detected. Column 502b indicates the first corrective measure to be performed for the particular corresponding picture quality issue that was detected as indicated in column 502a. Column 502c indicates the second corrective measure to be performed for the particular corresponding picture quality issue that was detected as indicated in column 502a if the corrective measure indicated in column 502b was not successful. Column 502d indicates the second corrective measure to be performed for the particular corresponding picture quality issue that was detected as indicated in column 502a if the corrective measure indicated in column 502c was not successful.

For example, the first corrective measure to be performed when the picture quality issue that was detected is a frozen video frame 504a is restarting the decoder of the receiving device 118 as indicated in column 502b. If restarting the decoder of the receiving device 118 was not successful to address the frozen video frame 504a, then a request may be sent for the video to be re-sent to the receiving device 118 as indicated in column 502c. Then, if re-sending the video to the receiving device 118 was not successful to address the frozen video frame 504a, the receiving device 118 may switch to an alternate video source, such as, for example, an on-demand source, other broadcast source or other pre-recorded source for the video program, as indicated in column 502d.

As another example, the first corrective measure to be performed when the picture quality issue that was detected is macroblocking 504b is, as indicated in column 502b, switching to a standard definition channel currently broadcasting the same program in a standard definition format. If switching to a standard definition channel was not successful to address the macroblocking 504b, then the decoder of the receiving device 118 will be restarted as indicated in column 502c. If restarting the decoder of the receiving device 118 was not successful to address the macroblocking 504b, the receiving device 118 may switch to an alternate video source, such as, for example, an on-demand source, other broadcast source or other pre-recorded source for the video program, as indicated in column 502d.

The numbers, types, orders and combinations of corrective measures to be performed as indicated in table 500 are examples. Various other numbers, types, orders and combinations of corrective measures to be performed may also or instead be present in table 400 or otherwise performed. In various alternative embodiments, a combination of some corrective measures may be performed concurrently. For example, the decoder of the receiving device 118 may be restarted concurrently with or otherwise in conjunction with requesting the video be re-sent.

Figure 6:
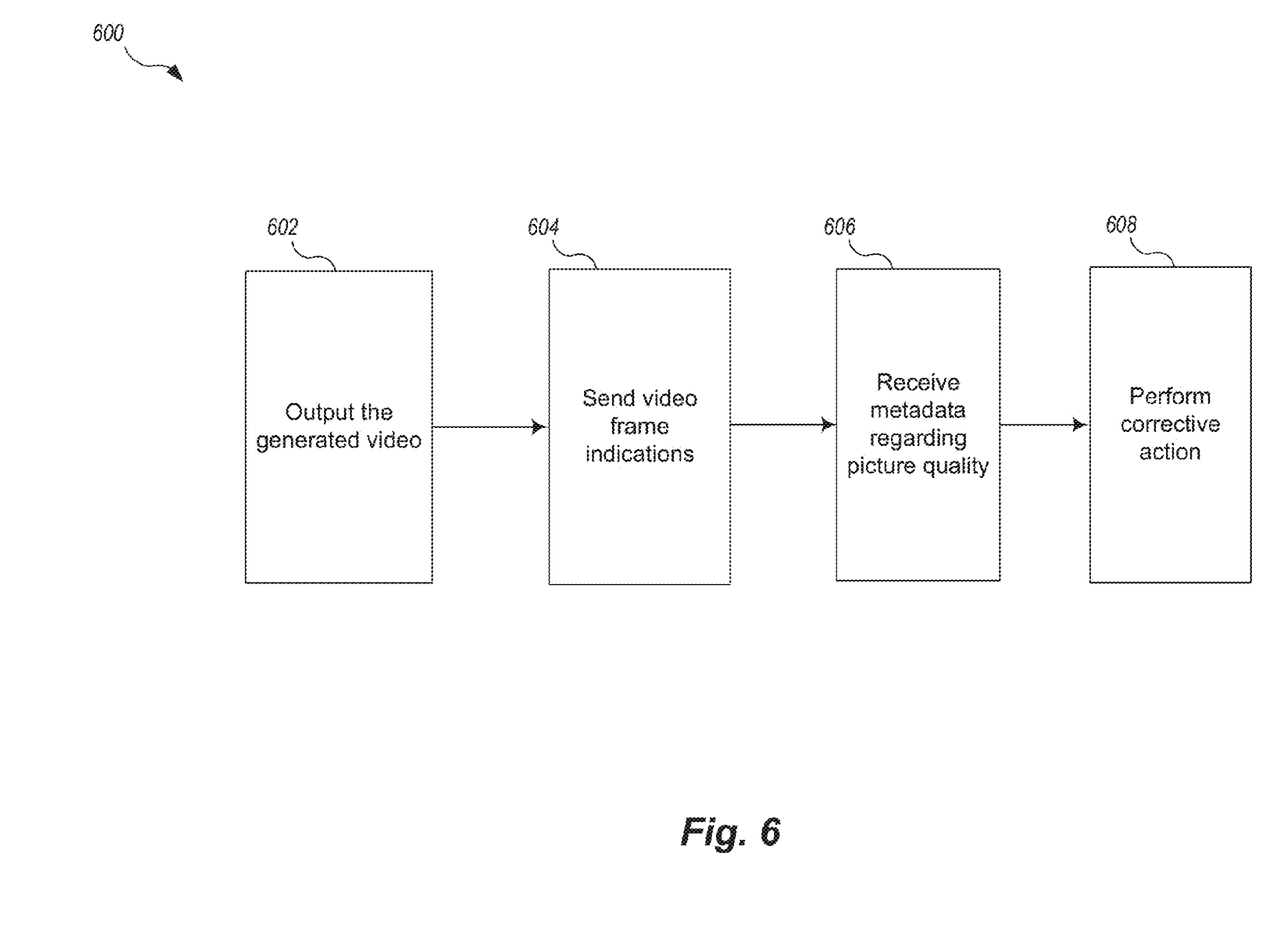
FIG. 6 is a flow diagram of a method of picture quality monitoring based on received metadata regarding picture quality, according to one example embodiment.

FIG. 6 is a flow diagram of a method 600 of picture quality monitoring based on received metadata regarding picture quality, according to one example embodiment.

At 602, the receiving device 118 outputs the video it generates to the presentation device 120 for display on the presentation device 120.

At 604, the receiving device 118, while outputting the generated video to the presentation device 120, sends indications of the video frames which are currently being displayed on the presentation device 120. For example, the receiving device 118 may send such indications to a remote system in communication with the receiving device 118, such as content provider 104, content server 106, alternate video source server 122 or information server 138.

At 606, the receiving device 118, in response to sending the indications of which video frames of the plurality of video frames are currently being displayed on the presentation device, receives metadata regarding picture quality of the video frames that are currently being displayed on the presentation device 120. For example, the receiving device 118 may receive such metadata from a remote system in communication with the receiving device 118, such as content provider 104, content server 106, alternate video source server 122 or information server 138.

At 608, the receiving device 118, in response to receiving the metadata regarding picture quality of the video frames of the plurality of video frames that are currently being displayed on the presentation device 120, performs an action based on the received metadata that results in a corrective measure being taken to address the picture quality. For example, in various embodiments, this action may cause one or more of the example corrective measures shown in table 500 of FIG. 5 to occur or other actions described herein to be performed to address the detected picture quality issue.

Figure 7:
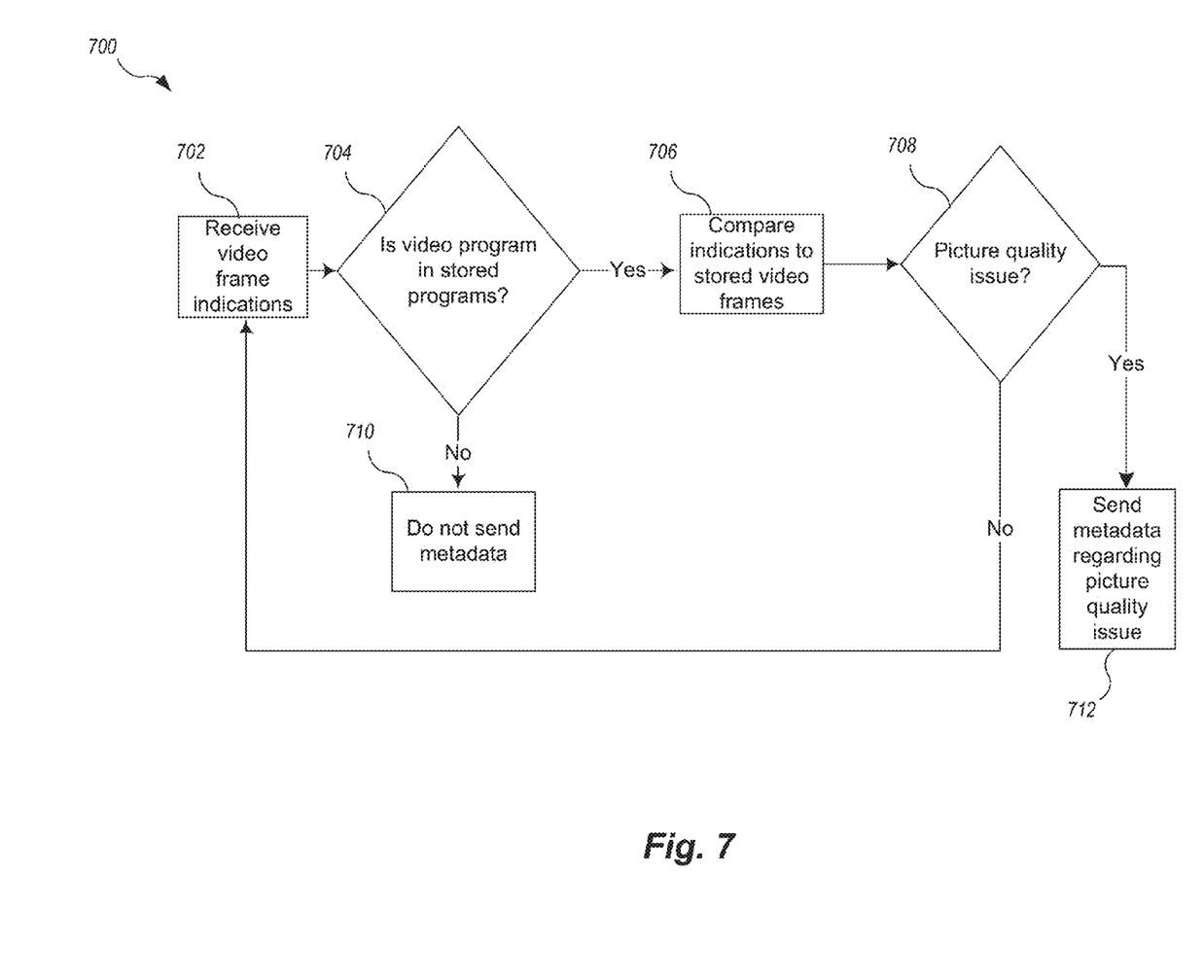
FIG. 7 is a flow diagram of a method of picture quality monitoring including sending metadata regarding picture quality, according to one example embodiment.

FIG. 7 is a flow diagram of a method 700 of picture quality monitoring including sending metadata regarding picture quality, according to one example embodiment.

At 702, the receiving device 118, or a system remote from the receiving device 118, receives an indication of which video program is currently being displayed on a presentation device 120 and indications of which video frames of the video program being displayed on the presentation device 120 are currently being displayed on the presentation device 120. These indications also include the corresponding video frame data or samples of the video frame data currently being displayed. In other embodiments, the receiving device 118 may receive the indications from an internal component of the receiving device 118, such as image processing unit 222 shown in FIG. 2.

At 704, the receiving device 118, or a system remote from the receiving device 118, determines whether the video program currently being displayed on the presentation device is included in the stored plurality of video programs. This is based on the received indications of which video program is currently being displayed on the presentation device. If it is determined that the video program currently being displayed on the presentation device is not included in the stored plurality of video programs, the process proceeds to 710, where no metadata is sent regarding picture quality issues because there is no video data for that particular video program. If it is determined that the video program currently being displayed on the presentation device is included in the stored plurality of video programs, the process proceeds to 706.

At 706, the receiving device 118, or a system remote from the receiving device 118, compares the received indications of video frames currently being displayed on the presentation device 120 to the stored plurality of digital video frames of the stored video program included in the stored plurality of video programs.

At 708, the receiving device 118, or a system remote from the receiving device 118, based on the comparison, determines whether there exists a picture quality issue in video frames that are currently being displayed on the presentation device 120. If it is determined there is not a picture quality issue in video frames that are currently being displayed on the presentation device 120, the process returns to 702 to continue to receive the video frame indications. If it is determined there is a picture quality issue in video frames that are currently being displayed on the presentation device 120, the process proceeds to 712.

At 712, the receiving device 118, or a system remote from the receiving device 118, sends metadata regarding the determined picture quality issues in the video frames that are currently being displayed on the presentation device. For example, the receiving device 118 may send such metadata to, or receive such metadata from, a remote system in communication with the receiving device 118, such as content provider 104, content server 106, alternate video source server 122 or information server 138.

While various embodiments have been described hereinabove, it is to be appreciated that various changes in form and detail may be made without departing from the spirit and scope of the invention(s) presently or hereafter claimed. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in an electronic picture quality monitoring system, comprising:
receiving, by the electronic picture quality monitoring system, video data from a remote source;
generating, by the electronic picture quality monitoring system, video for presentation on a presentation device based on the video data received from the remote source, the generated video including a plurality of video frames;
outputting, by the electronic picture quality monitoring system, the generated video to the presentation device for display on the presentation device;
while outputting the generated video to the presentation device, sending, by the electronic picture quality monitoring system, indications of which video frames of the plurality of video frames are currently being displayed on the presentation device;
in response to the sending indications of which video frames of the plurality of video frames are currently being displayed on the presentation device, receiving, by the electronic picture quality monitoring system, metadata regarding picture quality of the video frames of the plurality of video frames that are currently being displayed on the presentation device; and
in response to receiving the metadata regarding picture quality of the video frames of the plurality of video frames that are currently being displayed on the presentation device, performing, by the electronic picture quality monitoring system, an action based on the received metadata that results in a corrective measure being taken to address the picture quality.

2. The method of claim 1 wherein the metadata regarding picture quality of the video frames of the plurality of video frames that are currently being displayed on the presentation device includes metadata indicating there exists a picture quality issue regarding a frozen video frame.

3. The method of claim 1 wherein the metadata regarding picture quality of the video frames of the plurality of video frames that are currently being displayed on the presentation device includes metadata indicating there exists a picture quality issue regarding macroblocking in the video frames of the plurality of video frames that are currently being displayed.

4. The method of claim 1 wherein the performing an action based on the received metadata that results in a corrective measure being taken to address the picture quality includes tuning to a different channel currently playing a same video program represented by the generated video.

5. The method of claim 4 wherein the different channel is a channel playing a standard definition version of the same video program.

6. The method of claim 1 wherein the performing an action based on the received metadata that results in a corrective measure being taken to address the picture quality includes restarting a video decoder that produced the generated video.

7. The method of claim 1 wherein the performing an action based on the received metadata that results in a corrective measure being taken to address the picture quality includes causing video data from the remote source to be re-sent.

8. The method of claim 1 wherein the performing an action based on the received metadata that results in a corrective measure being taken to address the picture quality includes causing a notification to be displayed that offers an alternative source for receiving, by the electronic picture quality monitoring system, a same video program represented by the generated video.

9. The method of claim 1 wherein the performing an action based on the received metadata that results in a corrective measure being taken to address the picture quality includes switching to an alternative source for receiving, by the electronic picture quality monitoring system, a same video program represented by the generated video.

10. The method of claim 9 wherein the alternative source is an on-demand source for receiving the same video program.

11. The method of claim 1 wherein the performing an action based on the received metadata that results in a corrective measure being taken to address the picture quality includes sending data regarding the picture quality of the video frames of the plurality of video frames that are currently being displayed on the presentation device to a remote monitoring system for analysis.

12. The method of claim 1 wherein the sending indications of which video frames of the plurality of video frames are currently being displayed on the presentation device includes sending indications of only some of the plurality of video frames that are currently being displayed.

13. The method of claim 1 wherein the sending indications of which video frames of the plurality of video frames are currently being displayed on the presentation device includes sending indications of a specified percentage of the plurality of video frames that are currently being displayed.

* * * * *